US012601847B2

(12) United States Patent
Doshi

(10) Patent No.: US 12,601,847 B2
(45) Date of Patent: Apr. 14, 2026

(54) IMPROVING DILUTION OF PRECISION OF GLOBAL NAVIGATION SATELLITE SYSTEM

(71) Applicant: Sony Group Corporation, Tokyo (JP)

(72) Inventor: Jignesh Doshi, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 381 days.

(21) Appl. No.: 18/094,902

(22) Filed: Jan. 9, 2023

(65) Prior Publication Data

US 2024/0069212 A1 Feb. 29, 2024

Related U.S. Application Data

(60) Provisional application No. 63/373,621, filed on Aug. 26, 2022.

(51) Int. Cl.
*G01S 19/32* (2010.01)
*G01S 19/35* (2010.01)

(52) U.S. Cl.
CPC .............. *G01S 19/32* (2013.01); *G01S 19/35* (2013.01)

(58) Field of Classification Search
CPC .......... G01S 19/32; G01S 19/35; G01S 19/21; G01S 19/05
See application file for complete search history.

(56) References Cited

U.S. PATENT DOCUMENTS

| | | | | |
|---|---|---|---|---|
| 10,564,291 | B1 * | 2/2020 | McGregor | .............. G01S 19/36 |
| 11,101,894 | B2 | 8/2021 | Wetle | |
| 2014/0285373 | A1 * | 9/2014 | Kuwahara | .............. H01Q 21/08 |
| | | | | 342/27 |
| 2015/0048990 | A1 * | 2/2015 | Feller | ........................ H01Q 1/48 |
| | | | | 343/848 |
| 2019/0237879 | A1 * | 8/2019 | Park | ........................ H01Q 1/243 |
| 2021/0036432 | A1 * | 2/2021 | Kim | ......................... H01Q 1/48 |

(Continued)

FOREIGN PATENT DOCUMENTS

| | | | | | |
|---|---|---|---|---|---|
| DE | 102022203585 | A1 * | 10/2023 | ............... | H01Q 5/40 |
| KR | 20220061633 | A * | 5/2022 | ............. | B64U 20/80 |

(Continued)

OTHER PUBLICATIONS

18094902_2025-03-18_KR_20220061633_A_M.pdf, machine translation of KR-20220061633-A (Year: 2020).*

(Continued)

*Primary Examiner* — William Kelleher
*Assistant Examiner* — Kenneth W Good
(74) *Attorney, Agent, or Firm* — Trellis IP Law Group, PC

(57) ABSTRACT

A mobile device may include a first antenna positioned on a first substrate, the first antenna in communication with a global navigation satellite system (GNSS) receiver to receive first radio signals from at least four GNSS satellites and convert the first radio signals into first electronic signals and a second antenna positioned on a second substrate between 30 degrees and 90 degrees from the first antenna. With such multi-band antenna design, arrangement, and positioning, the GNSS receiver may maximize the number of satellites it can track which results in improved geometry of tracked satellites, which reduces dilution and precision and improves location accuracy of the GNSS receiver.

15 Claims, 8 Drawing Sheets

(56) References Cited

U.S. PATENT DOCUMENTS

| 2021/0280984 | A1 * | 9/2021 | Tanaka | H01Q 1/38 |
| 2021/0376467 | A1 * | 12/2021 | Wu | H01Q 21/30 |
| 2022/0021104 | A1 * | 1/2022 | Kaufmann | H01Q 5/364 |
| 2023/0178889 | A1 * | 6/2023 | Lee | G01S 19/49 |

FOREIGN PATENT DOCUMENTS

| RU | 2822631 C1 * | 7/2024 |
| WO | WO2022055607 A2 | 3/2022 |
| WO | WO2022152750 A1 | 7/2022 |

OTHER PUBLICATIONS

18094902_2025-05-13_DE_102022203585_A1_M.pdf, machine translation of DE-102022203585-A1 (Year: 2022).*

18094902_2025-09-02_RU_2822631_C1_M.pdf, machine translation of RU-2822631-C1 (Year: 2021).*

Compact Adaptive Planar Antenna Arrays for Robust Satellite Navigation Systems: https://core.ac.uk/download/pdf/224748105.pdf; by M.Sc. Safwat Irteza Butt; Apr. 30, 1983.

Modification of higher order natural mode in metamaterial loaded patch antenna; Swad Al Nahiyan et al.; ISSN 1751-8725; IET Microw. Antennas Propag., 2019, vol. 13 Iss. 4 pp. 442-447.

* cited by examiner

Global Navigation Satellite System 101

102

Network 105

108

Mobile Device 115

User 125

100

200

Antennas 202

GNSS Receiver 204

Processor 206

Memory 208

Display 210

300

310

315

320

350

$L$ $\varepsilon_r$ $h$

400

410

405

*L*

*W*

415

450

Z

*H*-Plane    *E*-Plane

X    Y

IMPROVING DILUTION OF PRECISION OF GLOBAL NAVIGATION SATELLITE SYSTEM

CROSS REFERENCES TO RELATED APPLICATIONS

This application claims the benefit of U.S. Provisional Patent Application Ser. No. 63/373,621, entitled "IMPROVING DOP (DILUTION OF PRECISION) OF GNSS SOLUTION BY EXPLOITING ORTHOGONALITY OF NULLS & LOBES IN THE ANTENNA PATTERNS OF A MULTIBAND GNSS RECEIVER", filed on Aug. 26, 2022, which is hereby incorporated by reference as if set forth in full in this application for all purposes.

BACKGROUND

Mobile devices access global navigation satellite system information to determine their locations. Mobile devices are increasingly designed to include multiple antennas that accommodate multiple bandwidths. The antennas are positioned to receive multiple L-band signals at the same time in the same direction. However, this configuration may increase dilution of precision and reduce the potential for maximum signal reception.

SUMMARY

In some embodiments, a mobile device comprises a first antenna positioned on a first substrate, the first antenna in communication with a global navigation satellite system (GNSS) receiver to receive first radio signals from at least four GNSS satellites and convert the first radio signals into first electronic signals. The mobile device may further include a second antenna positioned on a second substrate, the second antenna in communication with the GNSS receiver to receive second radio signals from at least four GNSS satellites and convert the second radio signals into second electronic signals, wherein the second antenna is positioned between 30 degrees and 90 degrees from the first antenna. The mobile device may further include a ground plane that is beneath the second antenna. The mobile device may further include the GNSS receiver in communication with the first antenna and the second antenna, the GNSS receiver receiving the first electronic signals from the first antenna and the second electronic signals from the second antenna. The mobile device may further include logic encoded in one or more non-transitory media for execution by the one or more processors and when executed is operable to receive the first electronic signals and the second electronic signals and determine a location of the mobile device.

In some embodiments, the first antenna generates a first radiation pattern with nulls that overlap with lobes from a second radiation pattern generated by the second antenna. In some embodiments, the first antenna is a first patch antenna, and the second antenna is a second patch antenna or a slot antenna. In some embodiments, the mobile device further includes a feedline that is in communication with the first antenna and the second antenna. In some embodiments, the first radio signals are received at a first frequency band and the second antenna receives the second radio signals at a second frequency band, the first frequency band being different from the second frequency band. In some embodiments, the first frequency band is an L1 band and the second frequency band is an L5 band. In some embodiments, the mobile device further includes a third antenna positioned on a third substrate in communication with the GNSS receiver to receive third radio signals from at least four GNSS satellites and convert the third radio signals into third electronic signals, wherein the third antenna is positioned between 30 degrees and 90 degrees from the second antenna. In some embodiments, the third antenna is a slot antenna and the third substrate includes a feedline that is in communication with the first antenna, the second antenna, and the third antenna. In some embodiments, the first radio signals are received at a first frequency band, the second antenna receives the second radio signals at a second frequency band, the third antenna receives the third radio signals at a third frequency band, and all three frequency band signals are different. In some embodiments, the first frequency band is an L2 band, the second frequency band is an L1 band, and the third frequency band is an L5 band.

In some embodiments, a GNSS receiver includes: a first antenna positioned on a first substrate, the first antenna in communication with a GNSS receiver to receive first radio signals from at least four GNSS satellites and convert the first radio signals into first electronic signals; a second antenna positioned on a second substrate, the second antenna in communication with the GNSS receiver to receive second radio signals from at least four GNSS satellites and convert the second radio signals into second electronic signals, wherein the second antenna is positioned between 30 degrees and 90 degrees from the first antenna; and a ground plane that is beneath the second antenna.

In some embodiments, the first antenna generates a first radiation pattern with nulls that overlap with lobes from a second radiation pattern generated by the second antenna. In some embodiments, the first antenna is a first patch antenna, and the second antenna is a second patch antenna or a slot antenna. In some embodiments, the GNSS receiver further includes a feedline that is in communication with the first antenna and the second antenna. In some embodiments, the first radio signals are received at a first frequency band and the second antenna receives the second radio signals at a second frequency band, the first frequency band being different from the second frequency band. In some embodiments, the first frequency band is an L1 band and the second frequency band is an L5 band. In some embodiments, the GNSS receiver further includes third antenna positioned on a third substrate in communication with the GNSS receiver to receive third radio signals from at least four GNSS satellites and convert the third radio signals into third electronic signals, wherein the third antenna is positioned between 30 degrees and 90 degrees from the second antenna. In some embodiments, the third antenna is a slot antenna and the third substrate includes a feedline that is in communication with the first antenna, the second antenna, and the third antenna. In some embodiments, the first radio signals are received at a first frequency band, the second antenna receives the second radio signals at a second frequency band, the third antenna receives the third radio signals at a third frequency band, and all three frequency band signals are different. In some embodiments, the first frequency band is an L2 band, the second frequency band is an L1 band, and the third frequency band is an L5 band.

The technology described below includes a GNSS receiver that is designed to position two or more antennas such that the null in the radiation pattern created by one antenna aligns with the lobe in the radiation pattern created by another antenna. As a result, the technology advantageously maximizes the number of satellites that can be tracked by a GNSS receiver and improves the dilution of precision at most locations and times.

A further understanding of the nature and the advantages of particular embodiments disclosed herein may be realized by reference of the remaining portions of the specification and the attached drawings.

DETAILED DESCRIPTION OF EMBODIMENTS

Example Environment 100

Figure 1:
FIG. 1 is a block diagram of an example network environment according to some embodiments described herein.
Figure 1:
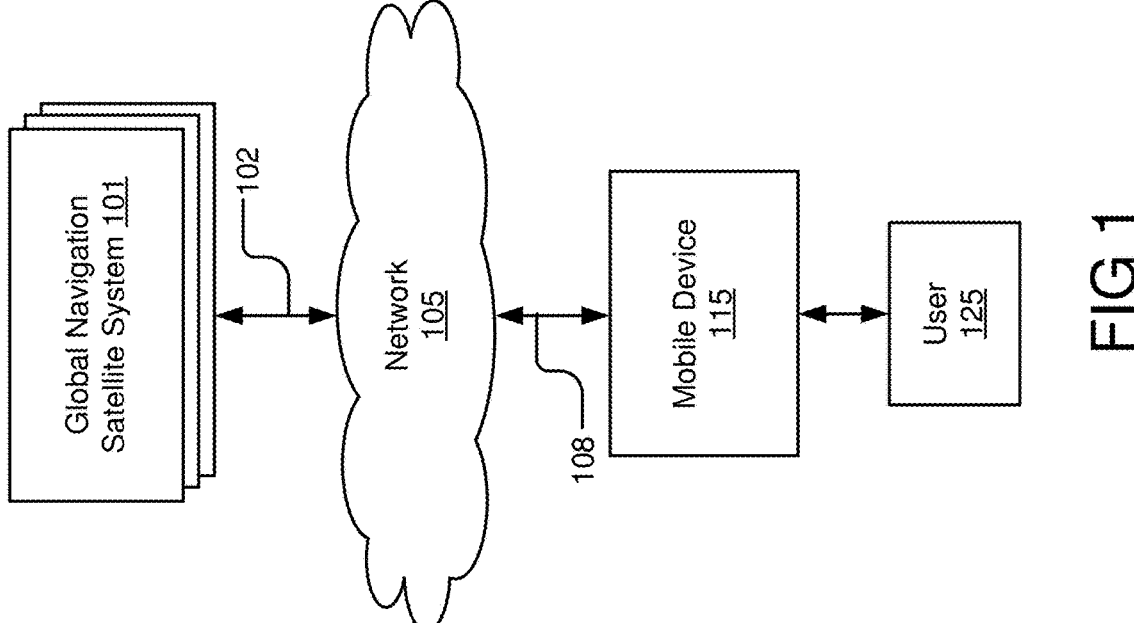

FIG. 1 illustrates a block diagram of an example environment 100. In some embodiments, the environment 100 includes a global navigation satellite system (GNSS) 101 and user devices 115a, 115n. In some embodiments, the environment 100 may include other servers or devices not shown in FIG. 1.

A GNSS 101 sends position and timing data to receiver devices on earth. Examples of a GNSS 101 include Global Positioning Systems (GPS) in the United States, Global Orbiting Navigation Satellite Systems (GLONASS) in Russia, BeiDou in China, Galileo in the European Union, a UK space-based augmentation system (UKSBAS) in the United Kingdom, QZSS in Japan, and NavIC in India.

GNSS 101 is used for, among other things, tracking/mapping devices, industrial machinery, sea vessels, air navigation, and automobiles. GNSS 101 transmits radio signals in the L-band. The L-band is a designation for the range of frequencies in the radio spectrum from 1 to 2 gigahertz. Most satellites operate in the L-band because L-band waves penetrate obstructions, such as clouds, fog, rain, storms, and vegetation.

The GNSS 101 may include a satellite, a processor, a memory, network communication hardware, a power system, and a propulsion system. The network communication system may include antennas and transponders that receive and retransmit signals. The power system may include solar panels that provide the power.

The GNSS 101 is communicatively coupled to the network 105 via signal line 102. Signal line 102 may be a wireless connection, such as radio. In some embodiments, the GNSS 101 sends and receives data to and from a mobile device 115 via the network 105. For example, a GNSS 101 may send signals that include ranging signals and navigation data to the mobile device 115.

The mobile device 115 may be a computing device that includes a memory, a hardware processor, a GPS receiver, and a satellite application. The mobile device 115 may include a tablet computer, a laptop, a mobile telephone, a wearable device (e.g., a watch), a head-mounted display, a mobile email device, a navigation device (such as in an automobile or other vehicle), or another electronic device capable of accessing a network 105 to communicate with a GNSS 101.

In the illustrated implementation, mobile device 115 is coupled to the network 105 via signal line 108. Signal line 108 may include one or more a wireless connections, such as radio, Wi-Fi®, Bluetooth®, or other wireless technology. The mobile device 115 is accessed by a user 125. The mobile device 115 in FIG. 1 is used by way of example. While FIG. 1 illustrates one mobile device 115, the disclosure applies to a system architecture having one or more mobile devices 115.

Example Mobile Device 200

Figure 2:
FIG. 2 is a block diagram of a mobile device according to some embodiments described herein.
Figure 2:
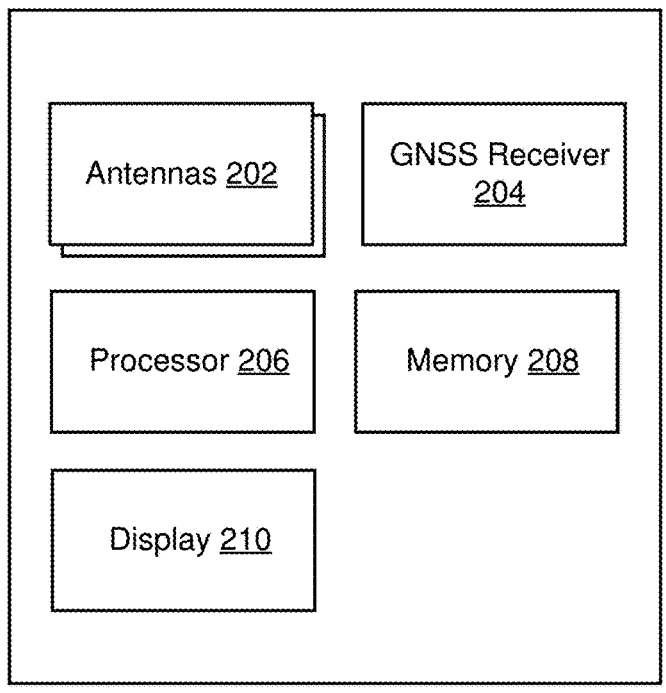

FIG. 2 is a block diagram of a mobile device 200 according to some embodiments described herein. The mobile device 200 receives radio signals that describe positioning and time information from satellites that are part of the GNSS 101 in FIG. 1.

The mobile device 200 includes antennas 202 for receiving radio signals, a GNSS receiver 204 in communication with the antenna 202, one or more processors 206 in communication with the GNSS receiver 204, a memory 208, and a display 210.

The antennas 202 receive radio signals from the GNSS 101 in FIG. 1. The antennas expand the signals and convert them into electronic signals so the electronic signals can be interpreted by the GNSS receiver 204. In some embodiments, the antennas 202 are part of the GNSS receiver 204.

The GNSS receiver 204 uses electronic signals from four or more satellites and calculates the distance to each satellite by timing a radio signal from each satellite to the GNSS receiver 204. The GNSS receiver 204 can receive and store the ephemeris and/or almanac data that tells the receive location of the satellites at various times. In some embodiments, the GNSS receiver 204 has anti-jamming capabilities and spoofing awareness to prevent interference with the functioning of the GNSS receiver 204.

The processor 206 may be one or more processors and/or processing circuits to execute program code and control basic operations of the mobile device 200. A "processor" includes any suitable hardware system, mechanism or component that processes data, signals, or other information. A processor may include a system with a general-purpose central processing unit (CPU) with one or more cores (e.g., in a single-core, dual-core, or multi-core configuration), multiple processing units (e.g., in a multiprocessor configuration), a graphics processing unit (GPU), a field-programmable gate array (FPGA), an application-specific integrated circuit (ASIC), a complex programmable logic device (CPLD), dedicated circuitry for achieving functionality, or other systems.

The memory 208 is typically provided in mobile device 200 for access by the processor 206 and may be any suitable processor-readable storage medium, such as random access memory (RAM), read-only memory (ROM), Electrical Erasable Read-only Memory (EEPROM), Flash memory, etc., suitable for storing instructions for execution by the processor or sets of processors, and located separate from processor 206 and/or integrated therewith. Memory 208 can store software operating on the computing device 200 by the processor 206.

The display 210 displays content, e.g., positioning information, tracking information, images, and/or a user interface. In some embodiments, the display 210 receives touch input from a user. The display 210 may include any suitable display device such as a liquid crystal display (LCD), light emitting diode (LED), plasma display screen, touchscreen, three-dimensional display screen, or other visual display device.

Mobile devices frequently use microstrip patch antennas because they can be printed directly onto a circuit board, they are low cost, they have a low profile, and are easily fabricated.

Figure 3A:
FIG. 3A-3B illustrate an example microstrip patch antenna according to some embodiments described herein.
Figure 3A:
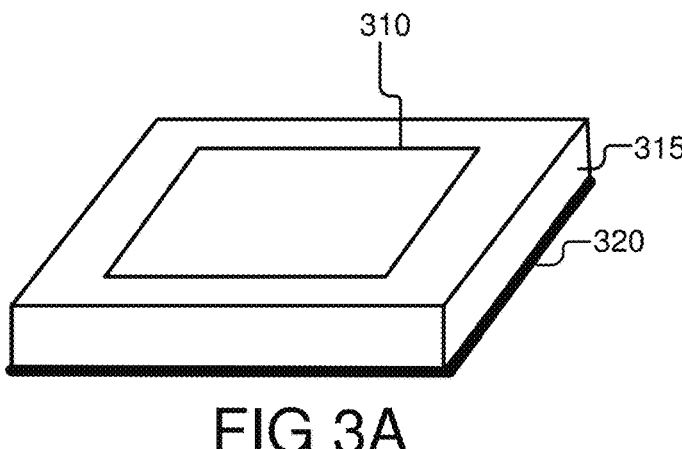

FIG. 3A illustrates a top view 300 of a patch antenna 310. The patch antenna 310 is a thin metallic patch made of a metal, such as gold or copper. The patch antenna 310 is placed on top of a dielectric substrate 315, which covers a ground plane 320.

The patch antenna 310 is illustrated as being a square shape, but various shapes and configurations are possible. For example, the shape may include square, circular disk, disk with slot, rectangular, disk sector, triangle, circular ring, quintuple, or ellipse. Rectangular and square patches are the most commonly used type of microstrip antennas. They can be used in numerous types of applications including circular polarization, beam scanning, radiation pattern control, and multiple frequency operation.

An antenna is designed by selecting a proper substrate 315 and calculating the width and length for the patch antenna 310. The substrate permittivity $\varepsilon_r$, thickness h, and loss tangent tan δ selection each have different effects on a radiating patch. A thicker substrate 315 provides more strength, increased radiation power, and higher impedance bandwidth. But a thicker substrate 315 is heavier and experiences higher dielectric loss and surface wave loss than a thinner substrate 315. The height h may be smaller than the wavelength of operation but should not be much smaller than 0.025 of a wavelength ($\frac{1}{40}^{th}$ of a wavelength) or the radiation efficiency $\varepsilon_r$ will be degraded.

A low substrate radiation efficiency $\varepsilon_r$ has similar effects to a thick substrate 315. Low $\varepsilon_r$ increases the radiating power by increasing the fringing fields around the edges of the patch. A high loss tangent tan δ reduces antenna efficiency by increasing the dielectric loss.

Figure 3B:
Figure 3B:
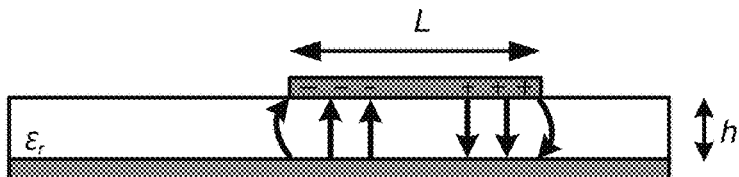

FIG. 3B illustrates a side view 350 of an example patch antenna according to some embodiments described herein. The patch antenna can be viewed as an open circuited transmission line. When this occurs, the voltage and current are out of phase. The beginning of the patch has a minimum voltage of –V Volts and the end of the patch has a voltage at a maximum of +V volts. The field underneath the patch roughly displays the fringing of the fields around the edges. The fringing fields are responsible for the radiation.

Figure 4A:
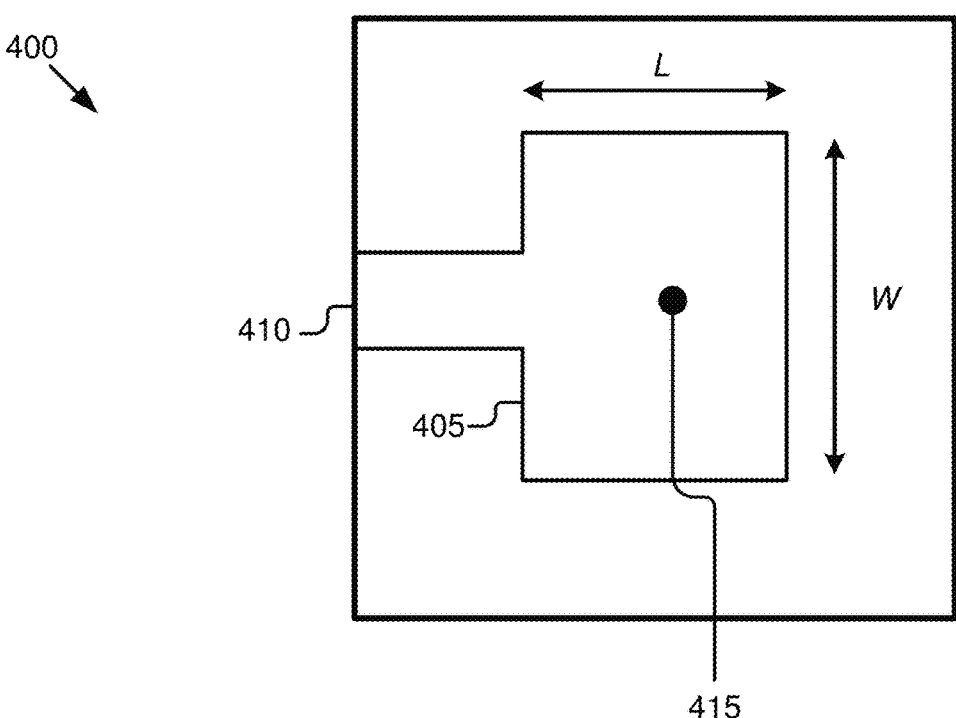
FIG. 4A illustrates an example top view of a microstrip antenna according to some embodiments described herein.

FIG. 4A illustrates an example top view 400 of a microstrip patch antenna 405 according to some embodiments described herein. A microstrip is a type of electrical transmission line that can be fabricated with any technology where a conductor is separated from a ground plane by a substrate. The microstrip transmission line 410 is made of a highly conductive metal, such as copper.

The microstrip transmission line 410 is attached to the microstrip patch antenna 405. In the center of the microstrip patch antenna 405 is the top of a radiation pattern 415 created by the microstrip patch antenna 405.

Figure 4B:
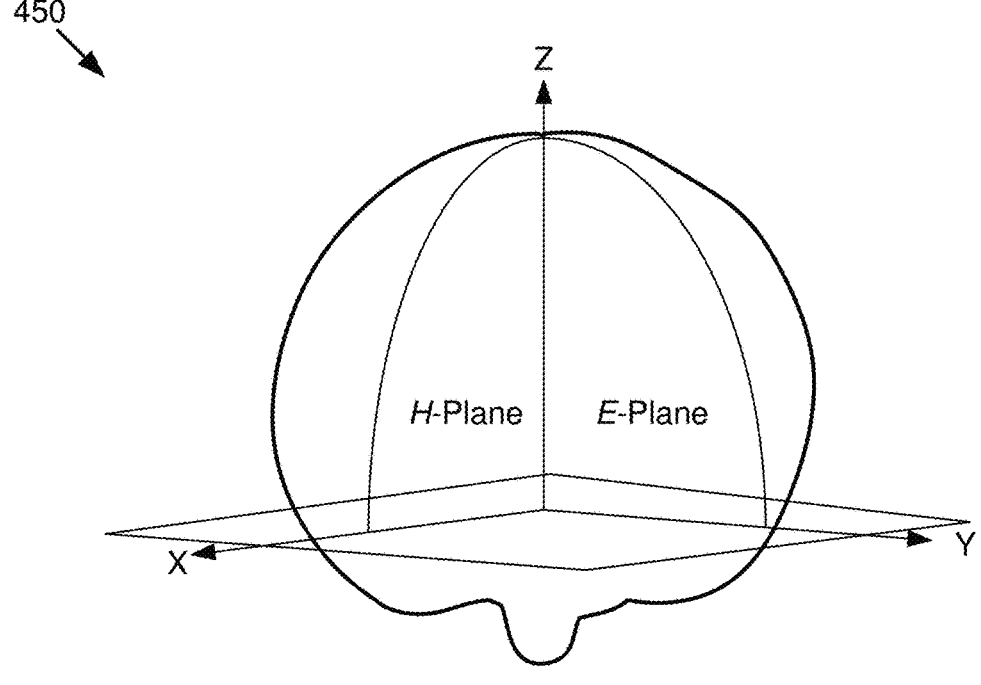
FIG. 4B illustrates an example radiation pattern created by a microstrip antenna according to some embodiments described herein.

FIG. 4B illustrates an example radiation pattern 450 created by a microstrip antenna according to some embodiments described herein. The directivity of patch antennas is approximately 5-7 dB. The radiation pattern 450 is typically described in two principal E and H planes (φ=0°, φ=90°). These planes are orthogonal and contain the field vector and the direction of maximum radiation. The radiation pattern 450 increases along the Z-axis such that the highest strength of the radiation pattern 450 is at the top of the lobe.

The radiation pattern of an antenna contains several nulls and lobes in three-dimensional space around the antenna. Nulls are the regions where the antenna gain is low and lobes are the regions where the antenna gain is higher. As a result, it is difficult to acquire and track satellites in the direction where the antenna pattern has nulls and easier to acquire and track satellites in the direction where the antenna pattern has lobes.

Figure 5:
FIG. 5 illustrates an example of a radio antenna radiation pattern according to some embodiments described herein.

FIG. 5 illustrates an example 500 of a radio antenna radiation pattern. The lobe with maximum directivity is known as the main lobe 505. The side lobes 510 usually represent unwanted radiation in undesired locations. The back lobe 515 is a type of side lobe 510 that is in the opposite direction from the main lobe 505.

Mobile devices are increasingly equipped with multiple antennas so that the mobile device can receive signals at different L-bands. For example, antennas are often equipped with two or more of the following bands: L1, L2, L5, and L6. GNSS first began with L1 and L2 bands. L1 operates at a frequency of 1575.42 MHz, L2 operates at a frequency of 1227.60 MHz, L5 operates at a frequency of 1176.45 MHz, and L6 operates at a frequency of 1278.75.

L1 is used to track the location of satellites. L2 is used to track the health of the satellites. L5 is used to improve the accuracy for civilian use, such as aircraft precision approach guidance. L6 is used for transmitting correction data for high-accuracy services, typically to provide precise point positioning. Most satellites transmit different L-band signals at the same time, so the signals are received in the same direction by a multiband GNSS receiver.

Figure 6A:
FIG. 6A illustrates an example of a stacked microstrip patch antenna and a microstrip slot antenna according to some embodiments described herein.
Figure 6A:
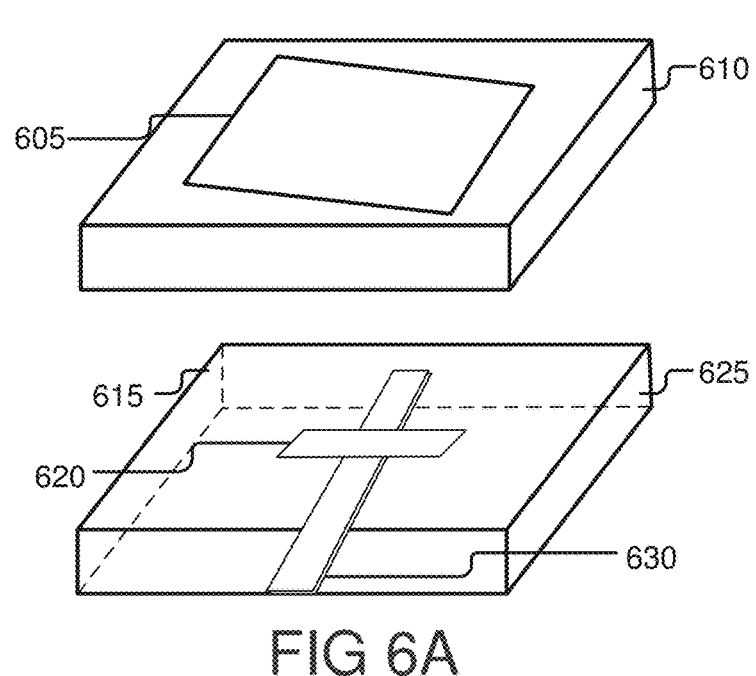

In some embodiments, stacked microstrip patches are used to achieve dual or multiple frequency operations. FIG. 6A illustrates an example 600 of a stacked microstrip patch antenna and a microstrip slot antenna. In some embodiments, the example 600 is part of an integrated circuit, which may include additional components, such as a radio frequency processing chip. The radio frequency processing chip may feed the feed line discussed below.

In FIG. 6A, a first patch 605 includes a first antenna and is on top of a first substrate 610. A ground plane 615 and a slot antenna 620 are on top of a second substrate 625 with a feedline 630 beneath the second substrate 625. The slot antenna 620 is an opening created in a conductive material that receives electromagnetic waves.

FIG. 6A illustrates that the first patch 605 is angled above the X-axis so that there is at least a 30 degree difference between the first patch 605 and the slot antenna 620. In some embodiments, there is between a 30-90 degree rotation between the two antennas. In some embodiments a patch is mounted to the substrate at a particular inclination to achieve the desired angle. In some embodiments, the substrate is mounted at an inclination to achieve the desired angle.

In some embodiments the feedline 630 is in communication with the first antenna and the second antenna. In some embodiments, the first patch 605 and the slot antenna 620 are fed separately in a piggyback configuration or fed together with an aperture-coupled feeding, inset feeding, probe feeding, or microstrip line feeding. The first substrate 610 and the second substrate 620 may be the same type of material or different types of material.

The antennas may receive any combination of radio signals at different L-band frequencies. For example, the first patch 605 may include a first antenna that receives first radio signals at a first frequency band, such as an L1 band, and the slot antenna 620 may receive second radio signals at a second frequency band, such as an L5 band. Other variations are possible, such as L2 and L1 bands.

Figure 6B:
FIG. 6B is an example of stacked microstrip patch antennas according to some embodiments described herein.
Figure 6B:
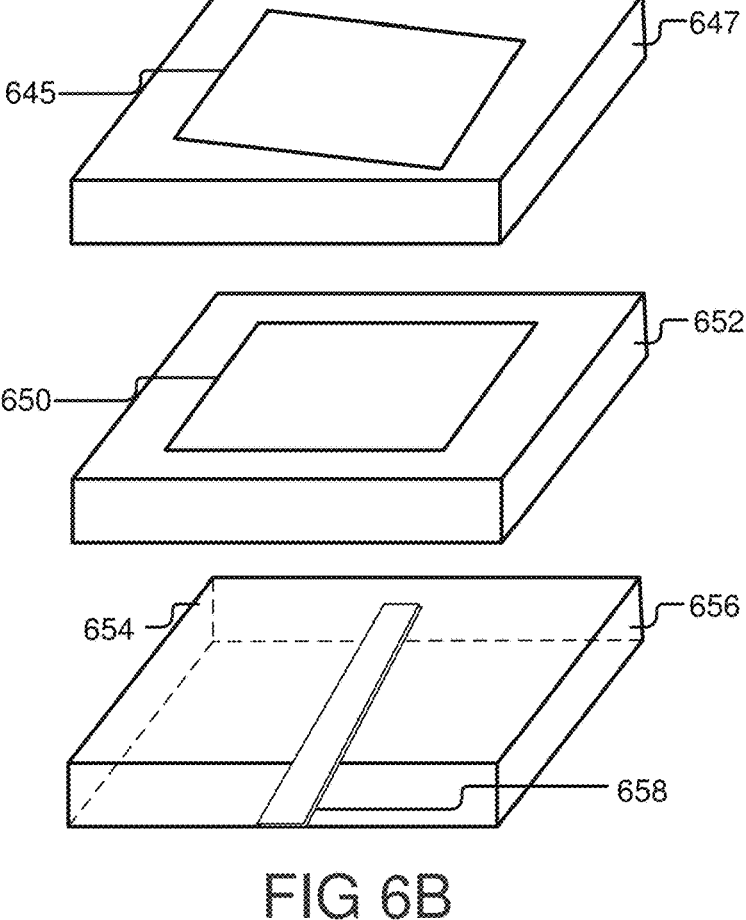

FIG. 6B is an example 640 of stacked microstrip patch antennas. In this example, a first patch 645 includes a first antenna and is on top of a first substrate 647. A second patch 650 includes a second antenna and is on top of a second substrate 652. A ground plane 654 is on top of a third substrate 656 with a feedline 658 beneath the third substrate 656.

Figure 6C:
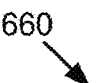
FIG. 6C illustrates an example radiation pattern created by the stacked microstrip antennas according to some embodiments described herein.
Figure 6C:
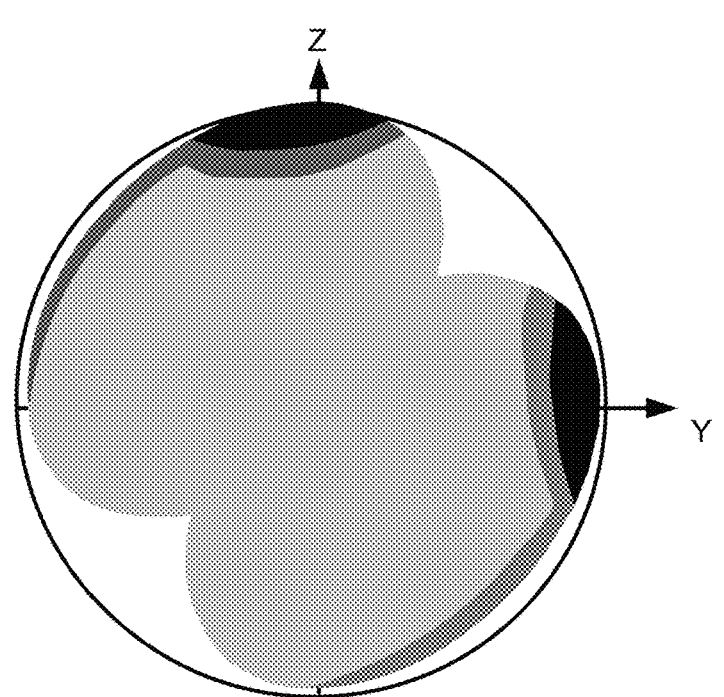

FIG. 6C illustrates an example radiation pattern 660 created by the stacked microstrip antennas according to some embodiments described herein. In some embodiments, there is between a 30-90 degree rotation between the two antennas that result in the radiation pattern of the two antennas resulting in an alignment between the null of a radiation pattern of the first antenna overlapping with the lobe of the radiation pattern of the second antenna. As a result, the GNSS receiver receives radio signals with at least one of the two L-band signals from one satellite all the time. Hence, the GNSS receiver may maximize the number of satellites it can track, which results in improved geometry of tracked satellites, which reduces dilution of precision and improves location accuracy of the GNSS receiver. For example, the technology may be particularly advantageous in urban canyons and locations where sky visibility is challenging.

Figures 7A, 7B:
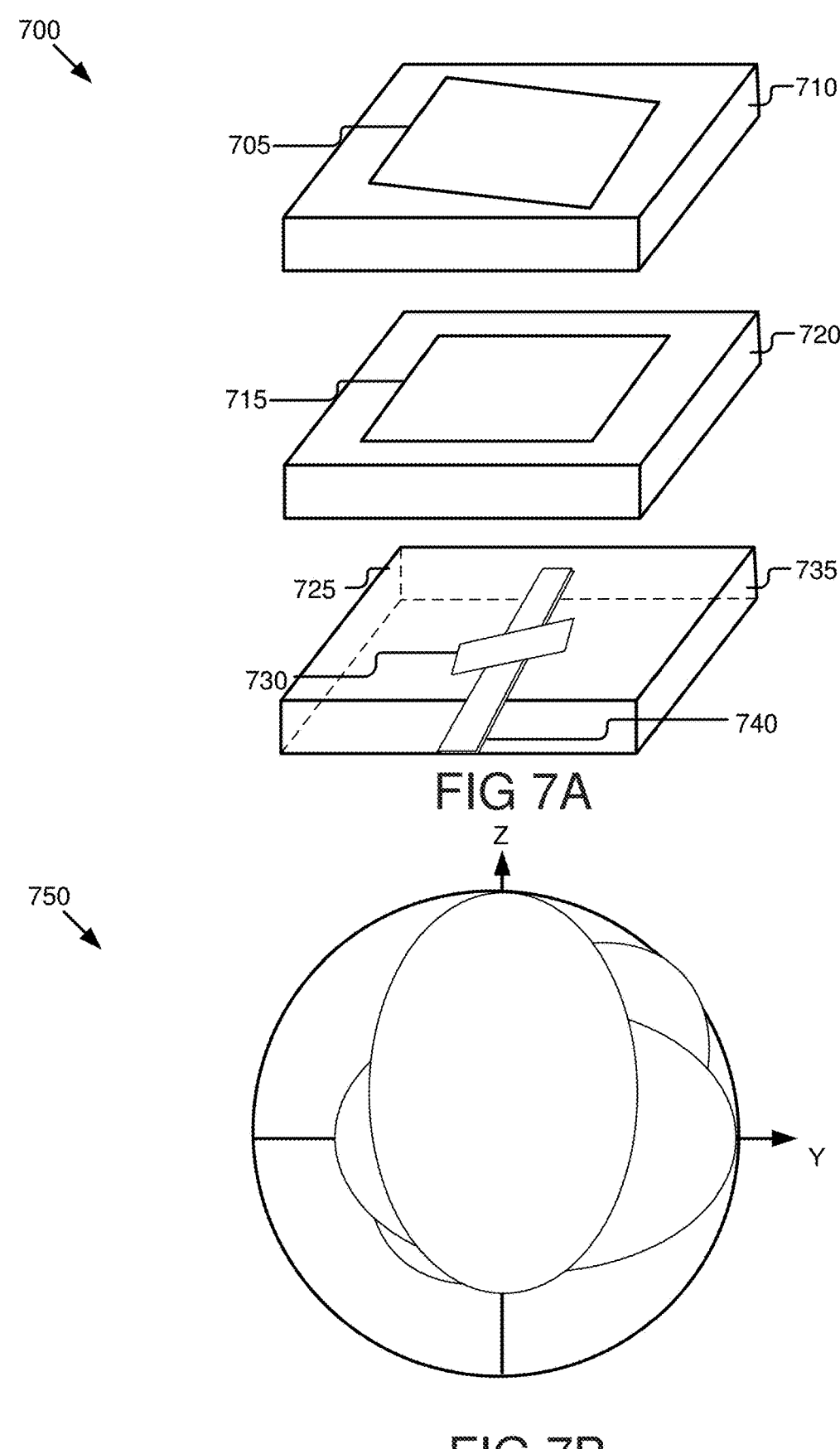
FIG. 7A illustrates another example of stacked microstrip antennas according to some embodiments described herein.
FIG. 7B illustrates another example radiation pattern created by the stacked microstrip antennas according to some embodiments described herein.

FIG. 7A illustrates another example 700 of three stacked microstrip antennas. In this example, a first patch 705 is on top of a first substrate 710; a second patch 715 is on top of a second substrate 720; and a ground plane 725 and a slot antenna 730 are on top of a third substrate 735 with a feedline 740 beneath the third substrate 735.

In some embodiments, the first patch 705, the second patch 715, and the slot antenna 730 are fed separately in a piggyback configuration or fed together with an aperture-coupled feeding, inset feeding, probe feeding, or microstrip line feeding. The first patch 705 and the second patch 715 may be different sizes and the first substrate 610 and the second substrate 620 may be the same type of material or different types of material.

The antennas may receive radio signals with any combinations of radio signals at different L-band frequencies. For example, the first patch 705 may include a first antenna that receives first radio signals at a first frequency band, such as an L2 band, the second patch 715 may include a second antenna that receives second radio signals at a second frequency band, such as an L1 band, and the slot antenna 730 may receive third radio signals at a third frequency band, such as an L5 band.

FIG. 7B illustrates another example radiation pattern created by the stacked microstrip antennas according to some embodiments described herein. In this example, the three microstrip antennas generate three lobes and nulls. The microstrip antennas are positioned such that there is a 90-degree difference between the first and third antennas.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A mobile device comprising:
  a first antenna being a first patch antenna having a planar patch surface, or a slot antenna having a slot in a planar plate surface of a plate, positioned on a first substrate, the first antenna in communication with a global navigation satellite system (GNSS) receiver to receive first radio signals from at least four GNSS satellites and convert the first radio signals into first electronic signals;
  a second patch antenna positioned on a second substrate disparate from the first substrate, the second antenna in communication with the GNSS receiver to receive second radio signals from at least four GNSS satellites and convert the second radio signals into second electronic signals,
    wherein the second antenna is in a stacked position with the first antenna and is mounted at an inclination on the second substrate or the second substrate is at an inclination to achieve a first angled rotation between 30 degrees and 90 degrees from the planar patch surface of the first patch antenna or from the planar plate surface of the slot antenna, and
    wherein, the inclination of the second antenna or the inclination of the second substrate causes an orientation of a first radiation pattern in which an alignment of a null of the first radiation pattern of the second antenna overlaps with a lobe of a second radiation pattern of the first antenna;
  a ground plane that is beneath the second antenna;
  the GNSS receiver in communication with the first antenna and the second antenna, the GNSS receiver receiving the first electronic signals from the first antenna and the second electronic signals from the second antenna;
  one or more processors in communication with the GNSS receiver; and
  logic encoded in one or more non-transitory media for execution by the one or more processors and when executed is operable to receive the first electronic signals and the second electronic signals and determine a location of the mobile device.

2. The mobile device of claim 1, further comprising a feedline that is in communication with the first antenna and the second antenna.

3. The mobile device of claim 1, wherein the first radio signals are received at a first frequency band and the second antenna receives the second radio signals at a second frequency band, the first frequency band being different from the second frequency band.

4. The mobile device of claim 3, wherein the first frequency band is an L1 band and the second frequency band is an L5 band.

5. The mobile device of claim 1, further comprising a third antenna positioned on a third substrate disparate from the first substrate and second substrate, the third antenna in communication with the GNSS receiver to receive third radio signals from at least four GNSS satellites and convert the third radio signals into third electronic signals, wherein the third antenna is in the stacked position with the first antenna and is mounted at an inclination on the second substrate or the second substrate is at an inclination to achieve a second angle rotation between 30 degrees and 90 degrees from the first angled rotation position of the second antenna.

6. The mobile device of claim 5, wherein the first radio signals are received at a first frequency band, the second antenna receives the second radio signals at a second frequency band, the third antenna receives the third radio signals at a third frequency band, and all three frequency band signals are different.

7. The mobile device of claim 6, wherein the first frequency band is an L2 band, the second frequency band is an L1 band, and the third frequency band is an L5 band.

8. A global navigation satellite system (GNSS) receiver comprising:
  a first antenna being a first patch antenna having a planar patch surface, or a slot antenna having a slot in a planar plate surface of a plate, positioned on a first substrate, the first antenna in communication with a GNSS receiver to receive first radio signals from at least four GNSS satellites and convert the first radio signals into first electronic signals;
  a second patch antenna positioned on a second substrate disparate from the first substrate, the second antenna in communication with the GNSS receiver to receive second radio signals from at least four GNSS satellites and convert the second radio signals into second electronic signals,
    wherein the second antenna is in a stacked position with the first antenna and is mounted at an inclination on the second substrate or the second substrate is at an inclination to achieve a first angled rotation between 30 degrees and 90 degrees from the planar patch surface of the first patch antenna or from the planar plate surface of the slot antenna, and
    wherein, the inclination of the second antenna or the inclination of the second substrate causes an orientation of a first radiation pattern in which an alignment of a null of the first radiation pattern of the second antenna overlaps with a lobe of a second radiation pattern of the first antenna; and
  a ground plane that is beneath the second antenna.

9. The GNSS receiver of claim 8, further comprising a feedline that is in communication with the first antenna and the second antenna.

10. The GNSS receiver of claim 8, wherein the first radio signals are received at a first frequency band and the second antenna receives the second radio signals at a second frequency band, the first frequency band being different from the second frequency band.

11. The GNSS receiver of claim 10, wherein the first frequency band is an L1 band and the second frequency band is an L5 band.

12. The GNSS receiver of claim 8, further comprising a third antenna positioned on a third substrate disparate from the first substrate and second substrate, the third antenna in communication with the GNSS receiver to receive third radio signals from at least four GNSS satellites and convert the third radio signals into third electronic signals, wherein the third antenna is in the stacked position with the first antenna and is mounted at an inclination on the second substrate or the second substrate is at an inclination to achieve between 30 degrees and 90 degrees from the first angled rotation position of the second antenna.

13. The GNSS receiver of claim 12, wherein the first radio signals are received at a first frequency band, the second antenna receives the second radio signals at a second frequency band, the third antenna receives the third radio signals at a third frequency band, and all three frequency band signals are different.

14. The GNSS receiver of claim 13, wherein the first frequency band is an L2 band, the second frequency band is an L1 band, and the third frequency band is an L5 band.

15. A global navigation satellite system (GNSS) receiver comprising:

a first antenna being a first patch antenna having a planar patch surface and positioned on a first substrate, the first antenna in communication with a GNSS receiver to receive first radio signals from at least four GNSS satellites and convert the first radio signals into first electronic signals;

a second antenna being a slot antenna having a slot in a planar plate surface of a plate and positioned on a second substrate disparate from the first substrate, the second antenna in communication with the GNSS receiver to receive second radio signals from at least four GNSS satellites and convert the second radio signals into second electronic signals, wherein the second antenna is in a stacked position with the first antenna and the planar plate surface of the second antenna is inclined to achieve a first angled rotation between 30 degrees and 90 degrees from the planar patch surface of the first antenna, and wherein, the inclination of the second antenna or the inclination of the second substrate causes an orientation of a first radiation pattern in which an alignment of a null of the first radiation pattern of the second antenna overlaps with a lobe of a second radiation pattern of the first antenna; and a ground plane that is beneath the second antenna.

* * * * *